US012062303B2

(12) United States Patent
Kiamilev

(10) Patent No.: US 12,062,303 B2
(45) Date of Patent: Aug. 13, 2024

(54) LED DRIVER CIRCUITRY FOR AN INFRARED SCENE PROJECTOR SYSTEM

(71) Applicant: CHIP DESIGN SYSTEMS INC., Claymont, DE (US)

(72) Inventor: Fouad Kiamilev, Claymont, DE (US)

(73) Assignee: CHIP DESIGN SYSTEMS INC., Claymont, DE (US)

( * ) Notice: Subject to any disclaimer, the term of this patent is extended or adjusted under 35 U.S.C. 154(b) by 344 days.

(21) Appl. No.: 17/828,337

(22) Filed: May 31, 2022

(65) Prior Publication Data

US 2023/0386372 A1 Nov. 30, 2023

(51) Int. Cl.

| | |
|---|---|
| ***G09G 3/00*** | (2006.01) |
| ***G09G 3/32*** | (2016.01) |
| ***H05B 45/00*** | (2022.01) |
| ***H05B 45/30*** | (2020.01) |
| ***H05B 45/397*** | (2020.01) |
| ***H05B 45/40*** | (2020.01) |

(52) U.S. Cl.

CPC ............. *G09G 3/002* (2013.01); *G09G 3/006* (2013.01); *G09G 3/32* (2013.01); *H05B 45/00* (2020.01); *H05B 45/30* (2020.01); *H05B 45/397* (2020.01); *H05B 45/40* (2020.01); *G09G 2300/0814* (2013.01); *G09G 2300/0876* (2013.01); *G09G 2330/12* (2013.01)

(58) Field of Classification Search

CPC .......... G09G 3/002; G09G 3/006; G09G 3/32; G09G 2300/0814; G09G 2300/0876; G09G 2330/12; G09G 2300/0828; G09G 2310/08; H05B 45/00; H05B 45/30; H05B 45/397; H05B 45/40

USPC .......................................................... 315/291

See application file for complete search history.

(56) References Cited

U.S. PATENT DOCUMENTS

| | | | | |
|---|---|---|---|---|
| 5,978,393 | A * | 11/1999 | Feldman | H01S 5/0683 372/31 |
| 8,111,217 | B2 * | 2/2012 | Caligiore | G09G 3/3233 315/169.3 |
| 8,947,008 | B2 * | 2/2015 | Chuang | H05B 45/50 315/240 |
| 9,030,126 | B2 * | 5/2015 | Tsao | H05B 45/14 315/192 |
| 11,653,432 | B1 * | 5/2023 | Meng | H05B 45/48 315/291 |
| 2010/0002470 | A1 * | 1/2010 | Kiamilev | G05F 1/67 363/16 |
| 2010/0327918 | A1 * | 12/2010 | Curzan | H04N 23/21 327/108 |

(Continued)

*Primary Examiner* — Ryan Jager

(74) *Attorney, Agent, or Firm* — Hovey Willams LLP

(57) ABSTRACT

A circuit for driving a light emitting diode (LED) comprises a plurality of current supply level circuits wherein each current supply level circuit is configured to control a different amount of electric current flowing through the LED. Each current supply level circuit includes a circuit enable transistor, a drive current transistor, and a gain control transistor. The circuit enable transistor is configured to enable current flow through the current supply level circuit. The drive current transistor is configured to control an amount of electric current flowing through the current supply level circuit. The gain control transistor is configured to control a range of the amount of electric current flowing through the current supply level circuit.

20 Claims, 11 Drawing Sheets

(56) References Cited

U.S. PATENT DOCUMENTS

2014/0049182 A1* 2/2014 Kawae ................. G09G 3/3233 315/227 R
2014/0070725 A1* 3/2014 Qi ...................... H10K 59/1213 257/40
2014/0333680 A1* 11/2014 Choi ...................... H05B 45/60 315/307
2014/0361708 A1* 12/2014 Nathan ................ G09G 3/3233 315/291
2014/0367593 A1* 12/2014 LaVeigne ............... H05B 41/38 250/504 R
2015/0061537 A1* 3/2015 Kanda .................. G09G 3/3233 315/291
2015/0061538 A1* 3/2015 Miyazawa ........... G09G 3/3233 315/291
2016/0035282 A1* 2/2016 Lu .......................... H05B 45/60 315/291
2016/0192447 A1* 6/2016 Kovatchev ........... H05B 45/397 315/193
2019/0364626 A1* 11/2019 Chen ...................... H05B 45/10
2023/0099245 A1* 3/2023 Takahashi .............. H05B 45/46 315/291
2023/0180363 A1* 6/2023 Kim ..................... H05B 45/397 315/291
2023/0180364 A1* 6/2023 Zhu ...................... H05B 45/355 315/291
2023/0189409 A1* 6/2023 Xiong .................... H05B 45/31 315/294
2023/0217564 A1* 7/2023 Kim .................. G02F 1/133514 315/291
2023/0276550 A1* 8/2023 Chen .................... H05B 45/395 315/291
2023/0284352 A1* 9/2023 Xu ......................... H05B 45/20 315/291
2023/0386372 A1* 11/2023 Kiamilev ............. H05B 45/397
2024/0185767 A1* 6/2024 Bower ................. G09G 3/3426

* cited by examiner

LED DRIVER CIRCUITRY FOR AN INFRARED SCENE PROJECTOR SYSTEM

FIELD OF THE INVENTION

Embodiments of the current invention relate to electronic circuitry that drives a light emitting diode (LED) array for use with an infrared scene projector.

BACKGROUND

Infrared (IR) scene projectors display imagery (or moving video) of a scene that includes a target of interest in which an apparent temperature of the target is accurately portrayed, thereby generating thermal imagery. Targets may include vehicles, aircraft, missiles, rockets, or the like, which have specific thermal signatures. The thermal imagery is used by an IR detector system in order to test its target tracking abilities. That is, an IR scene projector is positioned in direct view of the IR detector system so that the thermal imagery of the target can be detected by the IR detector. IR scene projectors provide a desirable testing environment because it is not always practical or cost effective to send out vehicles or aircraft just to be able to test the IR detector system.

IR scene projectors include an array of picture elements (pixels) arranged in a two-dimensional grid that generate the thermal imagery. Conventional IR scene projectors include a resistor or resistive component for each pixel. The pixels that form the image of the target are actually heated up to the temperature of the target in order to project the scene accurately. There are significant drawbacks to this implementation. The resistor pixel array consumes a large amount of power and generates a large amount of heat which creates an extreme testing environment. In addition, the resistor pixel array cannot accurately display objects that have a very high temperature, such as the engines of aircraft, missiles, or rockets. Other IR scene projectors utilize digital light projection components which include a heated object as the light source. These types of projectors have the same drawbacks as the resistor pixel array in addition to trying to flickering or lack of video smoothness associated with a digital projection.

An improved technology utilizes a light emitting diode (LED) for each pixel in the pixel array. The LEDs emit radiation in the infrared, or thermal imaging, spectrum such as with a center wavelength of approximately 3.8 microns. Thus, the IR LED array can more accurately project the apparent temperature of very hot objects. However, there are challenges to properly driving, or controlling, the IR LED array. The radiance, or brightness output, of each LED varies linearly with the amount of electric current flowing through the LED. However, the apparent temperature of each LED varies non-linearly with the radiance and in turn, the current. A typical scene of tracking a target may involve periods of time during which the target is small and most of the image has a cold temperature as well as periods of time when the target is large and most of the image has a hot temperature. The difference in current for the LED array to project the cold scene versus the hot scene may be many orders of magnitude. Traditional LED driver electric circuitry is not configured to adequately supply such a large range of electric current.

SUMMARY OF THE INVENTION

Embodiments of the current invention address one or more of the above-mentioned problems and provide a distinct advance in the art of electronic circuitry for use with an infrared scene projector that includes an array of light emitting diodes (LEDs). The electronic circuitry includes LED driver circuits to control the amount of current that flows through the LED array, which in turn, controls the apparent temperature of a scene displayed on the LED array. Each LED driver circuit includes a plurality of current supply level circuits each of which controls a different range of current that flows through each LED. For example, a first current supply level circuit may control a small range of current flow which provides a small range of apparent temperatures, and a second current supply level circuit may control a large range of current flow which provides a large range of apparent temperatures. In addition, multiple current supply level circuits may be enabled to provide very precise control of the apparent temperature, especially at higher temperatures.

One embodiment of the current invention provides a circuit for driving an LED, with the circuit comprising a plurality of current supply level circuits. Each current supply level circuit is configured to control a different amount of electric current flowing through the LED. Each current supply level circuit includes a circuit enable transistor, a drive current transistor, and a gain control transistor. The circuit enable transistor is configured to enable current flow through the current supply level circuit. The drive current transistor is configured to control an amount of electric current flowing through the current supply level circuit. The gain control transistor is configured to control a range of the amount of electric current flowing through the current supply level circuit.

Another embodiment of the current invention provides a circuit for driving a light emitting diode (LED) to display a portion of a frame for a sequence of frames. The circuit comprises a plurality of current supply level circuits, each of which is configured to control a different amount of electric current flowing through the LED. Each current supply level circuit includes a circuit enable transistor, a drive current transistor, a gain control transistor, and a drive current load circuit. The circuit enable transistor is configured to enable current flow through the current supply level circuit. The drive current transistor is configured to control an amount of electric current flowing through the current supply level circuit. The gain control transistor is configured to control a range of the amount of electric current flowing through the current supply level circuit. The drive current load circuit is configured to receive a first voltage level which sets the amount of electric current flowing through the current supply level circuit for a next frame and output a second voltage level to the drive current transistor to set the amount of electric current flowing through the current supply level circuit for a current frame.

Yet another embodiment of the current invention provides a circuit for driving an infrared (IR) light emitting diode (LED) configured to emit radiation having an apparent temperature. The circuit comprises a plurality of current supply level circuits, each of which is configured to control a different amount of electric current flowing through the IR LED such that each current supply level circuit controls the electric current flowing through the IR LED for a different range of apparent temperatures. The circuit enable transistor is configured to enable current flow through the current supply level circuit. The drive current transistor is configured to control an amount of electric current flowing through the current supply level circuit. The gain control transistor is configured to control a range of the amount of electric current flowing through the current supply level circuit.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
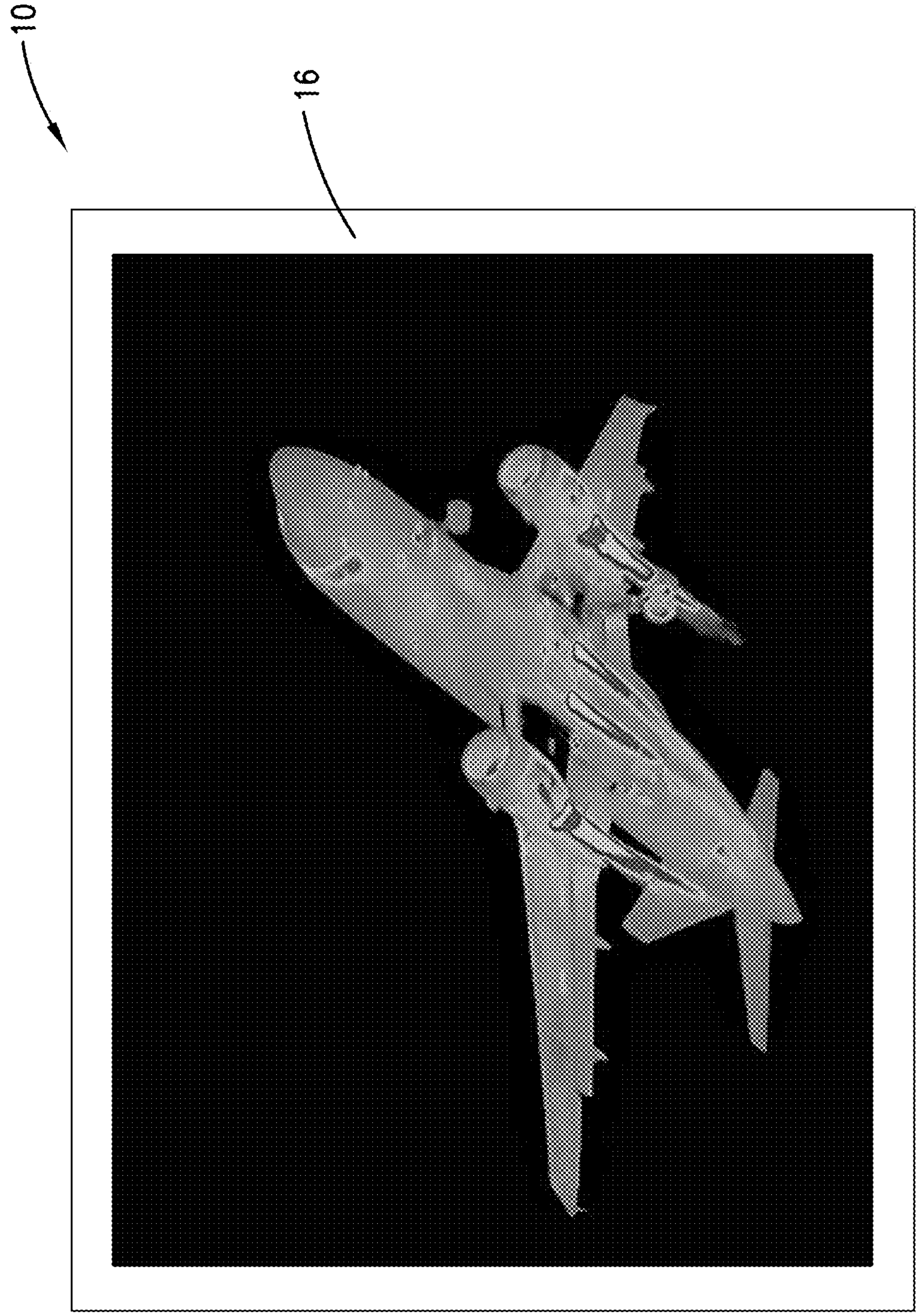
FIG. 1 is a front view of a light emitting diode (LED) array displaying a thermal image scene as part of an infrared scene projector system.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In the following description, the word "voltage" may be used to describe electric voltage, the word "current" may be used to describe electric current, and the word "power" may be used to describe electric power. The word "ground" may be used to describe electric ground. In addition, the word "signal" may be used to describe an electromagnetic wave conducted through an electrically conductive medium in which a voltage and/or a current varies, or may be constant, over time.

Figure 2:
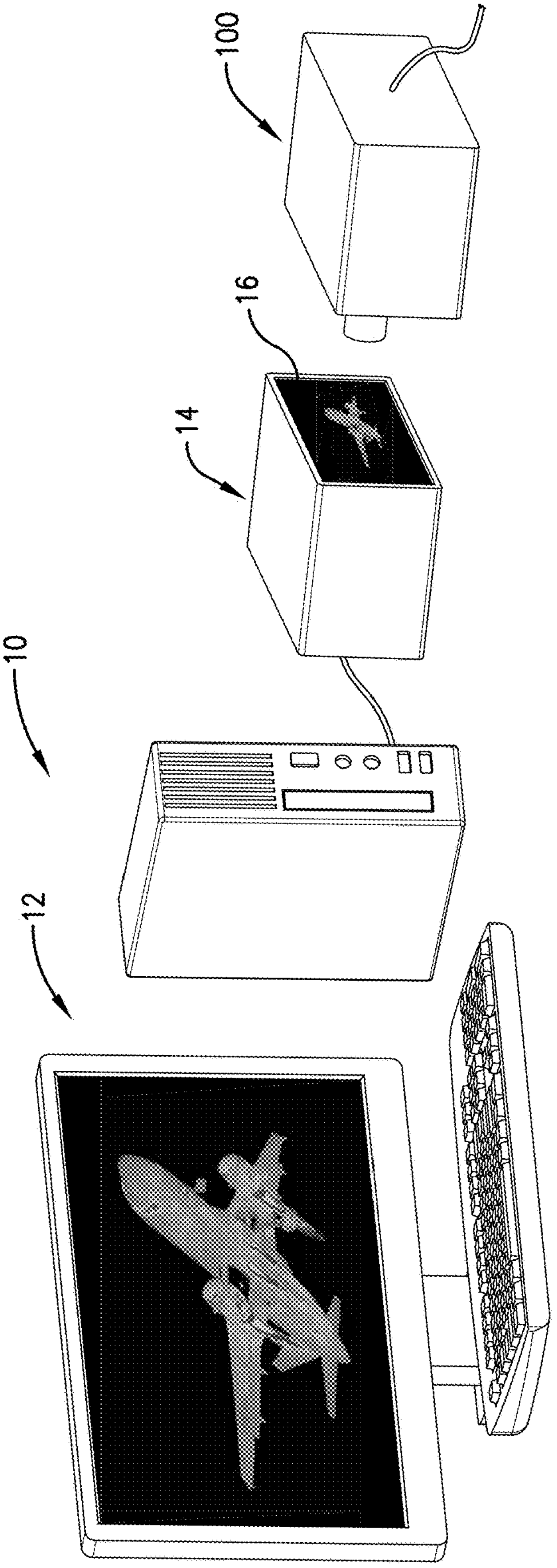
FIG. 2 is a perspective environmental view of the infrared scene projector system displaying a scene which is detected by an infrared detector system, the infrared scene projector system comprising a scene generator, LED array driver circuitry constructed in accordance with various embodiments of the invention, and the LED array.
Figure 3:
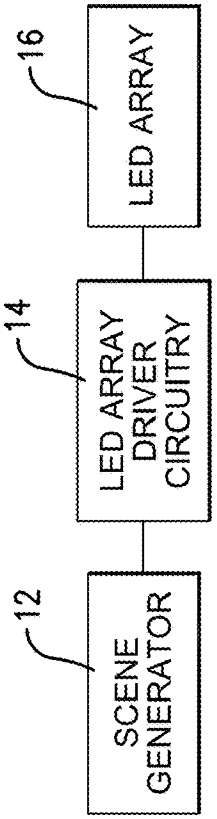
FIG. 3 is a block schematic diagram of the components of the infrared scene projector system.

Referring to FIGS. 1 and 2, an infrared (IR) scene projector system 10 is shown. The IR scene projector system 10 displays a thermal IR image or video with an accurate apparent temperature in order to test an IR detector system 100. The IR scene projector system 10, as also shown in FIG. 3, includes a scene generator 12, light emitting diode (LED) array driver circuitry 14, and an LED array 16. The IR scene projector system 10 may further include a housing which houses the LED array driver circuitry 14 and the LED array 16 along with electric power supply circuitry and signal processing circuitry.

The scene generator 12 generates the scene, i.e. images or video, of a target, such as a vehicle, an aircraft, a missile, a rocket, or the like, which have specific thermal signatures. Accordingly, the scene shows the target as it would be seen in the IR wavelength radiation band, i.e., approximately 700 nanometers (nm) to approximately 1 millimeter (mm). Furthermore, the scene generator 12 generates the scene as a sequence, a stream, or a series of image or video frames at a given frequency. The scene may be generated from data files, with formats such as JPG, GIF, MPEG, MOV, etc. The scene generator 12 may include a computing device such as high performance computers, workstation computers, desktop computers, laptop computers, palmtop computers, notebook computers, tablets or tablet computers, and so forth. The computing device may include a central processing unit, input devices such as keyboards and mice, and a display for monitoring the content of the scene. The scene generator 12 may further include filtering circuitry, analog to digital converters (ADCs), digital to analog converters (DACs), processing circuitry such as microprocessors (single-core or multi-core), microcontrollers, digital signal processors (DSPs), field-programmable gate arrays (FPGAs), analog and/or digital application-specific integrated circuits (ASICs), intelligence circuitry, and the like. The scene generator 12 outputs one or more electronic signals or data streams whose level or data value varies according to the content of the scene for each frame. For example, the scene generator 12 may output one or more electronic signals or data streams whose level or data value varies according to the apparent temperature of each pixel for each frame of the scene to be displayed.

The LED array driver circuitry 14, as described in more detail below, receives the output from the scene generator 12 and generates a plurality of electronic signals whose level varies according to the content of the scene, wherein each signal is received by a successive pixel of the LED array 16.

The LED array 16 displays the scene with the accurate apparent temperature. The LED array 16 includes a plurality of LEDs 18, each of which forms a pixel. Each LED 18 may be formed from materials such as gallium arsenide, gallium antimonide, indium phosphide, silicon germanium, and the like and may emit radiation in the IR spectrum with a wavelength ranging from approximately 700 nm to approximately 1 mm. In addition, each LED 18 may be configured to emit radiation with an apparent temperature ranging up to 2000 Kelvin (K) or higher.

The IR detector system 100 includes an array of sensors that are sensitive to thermal or IR radiation. The IR detector system 100 may output one or more electronic signals or data streams whose level or data value varies according to the IR radiation detected by the sensors. Referring to FIGS. 1 and 2, during the testing process, the sensor array of the IR detector system 100 is placed in view of the LED array 16. The scene, such as an aircraft in flight, is shown on the LED array 16 with the accurate apparent temperature in order to simulate high temperature objects. The IR detector system 100 senses the scene on the LED array 16 and outputs one or more electronic signals or data streams whose level or data value varies according to the IR radiation detected by the sensors.

Figure 4:
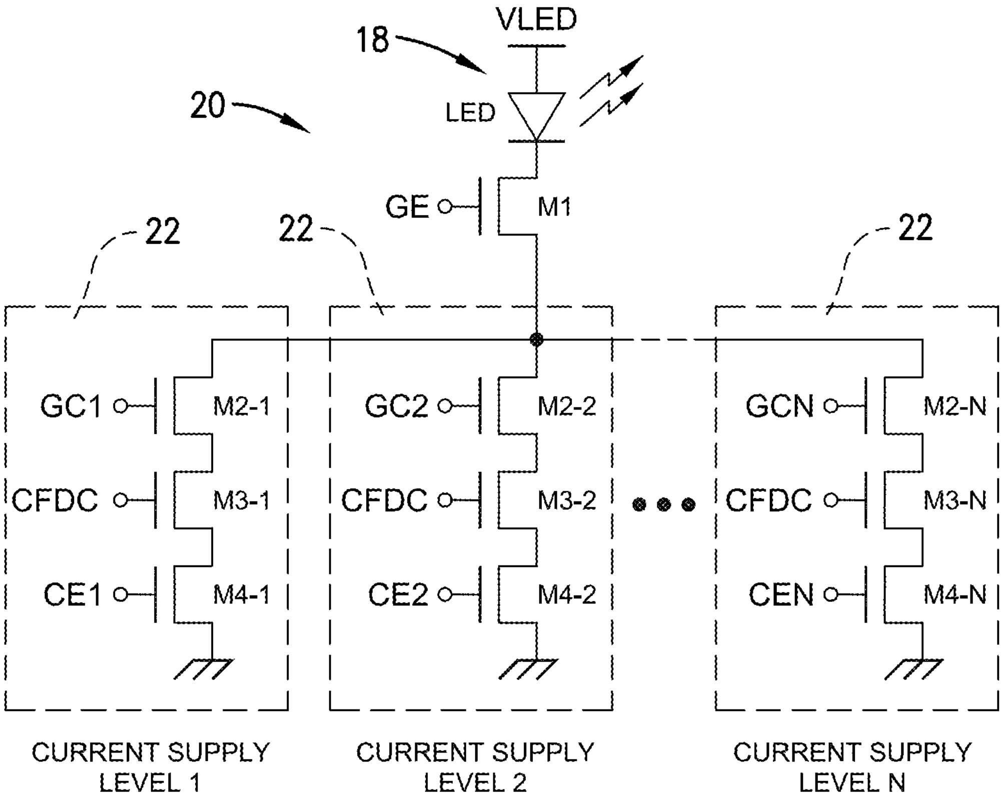
FIG. 4 is a schematic diagram of a first embodiment of a single LED driver circuit.

The LED array driver circuitry 14, constructed in accordance with various embodiments of the current invention, broadly comprises a plurality of single LED driver circuits 20 generally operating in parallel. The LED array driver circuitry 14 may also include additional circuitry such as registers, buffers, and the like. The LED array driver circuitry 14 may be implemented on a chip, or integrated circuit package. In addition, the LED array 16 may be solder (bump) bonded to the LED array driver circuitry 14 chip. Referring to FIG. 4, one embodiment of the single LED driver circuit 20 is shown along with one LED 18.

The LED 18 includes anode and cathode connections and emits radiation in the IR wavelength range with an apparent temperature which varies according to a logarithm of its radiance. The radiance of the LED 18 varies linearly according to the current flowing through it. Thus, the apparent temperature of the radiation of the LED 18 varies according to the logarithm of the current flowing through the LED 18. With this type of behavior, the apparent temperature of the LED 18 may range from 0 K to approximately 600 K with less than 1 milliamp (mA) of current flowing through it. The apparent temperature of the LED 18 may range from approximately 600 K to approximately 1200 K with up to 10 mA of current flowing through it.

The single LED driver circuit 20 includes a global enable transistor M1 and, in order to provide varying ranges of current to the LED 18 for varying ranges of apparent temperature, the single LED driver circuit 20 includes a plurality of current supply level circuits 22. The single LED driver circuit 20 may include additional components, such as registers, etc., which are not shown in the figures and not discussed in detail in this specification. The global enable transistor M1 is connected in series with the LED 18 and receives a global enable signal GE, which is a global signal that is transmitted to each single LED driver circuit 20 in the LED array driver circuitry 14. In various embodiments, the global enable transistor M1 is a metal oxide semiconductor field effect transistor (MOSFET) with, at least, drain, source, and gate terminals. In other embodiments, the global enable transistor may be another type of transistor, such as a bipolar junction transistor (BJT). In exemplary embodiments, the global enable transistor M1 is an N-channel MOSFET with the drain connected to the cathode of the LED 18, the gate receiving the global enable signal GE, and the source connected to the current supply level circuits 22. The global enable signal GE is an analog voltage signal whose level can be ramped up to slowly turn the LED 18 on by slowly increasing the current through the global enable transistor M1 and the LED 18 and ramped down to slowly turn each LED 18 off by slowly decreasing the current through the global enable transistor M1 and the LED 18. Alternatively, the voltage level of the global enable signal GE can be changed quickly to turn the LED 18 on and/or off quickly, or turn the LED 18 progressively on and/or off during any desirable or selective time period.

Each current supply level circuit 22 is connected in series with the LED 18 and in parallel with the other current supply level circuits 22. Each current supply level circuit 22 provides a different range, or level, of current supply to the LED 18 and includes a gain control transistor M2, a current frame drive current transistor M3, and a circuit enable transistor M4. In exemplary embodiments, each transistor M2, M3, M4 is an N-channel MOSFET, although in other embodiments, other types of transistors may be used. The transistors M2, M3, M4 are connected in series, as shown in FIG. 4, with the source of one connected to the drain of the next. The drain of the gain control transistor M2 is connected to the source of the global enable transistor M1, and the source of the circuit enable transistor M4 is connected to ground, with the current frame drive current transistor M3 connected between the gain control transistor M2 and the circuit enable transistor M4. The order of connection of the transistors M2, M3, M4 is merely exemplary and other configurations are possible. For example, the drain of the circuit enable transistor M4 may be connected to the source of the global enable transistor M1, and the source of the gain control transistor M2 may be connected to ground, with the current frame drive current transistor M3 connected between the circuit enable transistor M4 and the gain control transistor M2.

The gate of the circuit enable transistor M4 receives a circuit enable signal CE, which is a digital binary signal having an enable state and a disable state. When the circuit enable signal CE is in the enable state, the circuit enable transistor M4 is turned on and current is allowed to flow through the current supply level circuit 22. When the circuit enable signal CE is in the disable state, the circuit enable transistor M4 is turned off and current does not flow through the current supply level circuit 22.

The gate of the current frame drive current transistor M3 receives a current frame drive current signal CFDC, which is an analog voltage signal whose voltage level ranges from 0 V to Vmax. An exemplary value of Vmax is 5V. There is generally a direct correlation between the voltage level of the current frame drive current signal CFDC and the amount of current flow through the current supply level circuit 22. For example, a voltage level at Vmax results in a current flow of Imax through the current supply level circuit 22, while a voltage level near 0 V results in a current flow of near 0 A through the current supply level circuit 22.

The gate of the gain control transistor M2 receives a gain control signal GC, which is an analog voltage signal that controls the gain of the current frame drive current transistor M3 and by extension, a dynamic range of the current flow through the current supply level circuit 22. There is generally a direct correlation between the voltage level of the gain control signal GC and the gain of the current frame drive current transistor M3. For example, a higher voltage level of the gain control signal GC results in a higher gain of the current frame drive current transistor M3, while a lower voltage level of the gain control signal GC results in a lower gain of the current frame drive current transistor M3. The level of the gain of the current frame drive current transistor M3 sets the value of Imax. That is, a higher level of gain of the current frame drive current transistor M3 results in a greater value of Imax, while a lower level of gain of the current frame drive current transistor M3 results in a lower value of Imax. Thus, the voltage level of the gain control signal GC sets the dynamic range of the current flow through the current supply level circuit 22.

Each current supply level circuit 22 is included in the single LED driver circuit 20 to provide a level of current to the LED 18 that varies according to, among other parameters, the size of the current frame drive current transistor M3—specifically, a width of the gate of the current frame drive current transistor M3. That is, the size of the current frame drive current transistor M3 sets the highest level of Imax that can flow through the current supply level circuit 22. For instance, a larger size of the current frame drive current transistor M3 sets a greater highest level of Imax as compared to a smaller size of the current frame drive current transistor M3. In exemplary embodiments, a first current supply level circuit 22 includes the current frame drive current transistor M3-1 that is sized to allow up to 10 mA, i.e. Imax, of current to flow through the LED 18. A second current supply level circuit 22 includes the current frame drive current transistor M3-2 that is sized to allow up to 1 mA, i.e. Imax, of current to flow through the LED 18. Other current supply level circuits 22 may the current frame drive current transistor M3-N that is sized to allow for larger or smaller values of Imax.

The single LED driver circuit 20 further includes a drive current load circuit 24 which controls or establishes the timing for providing the current frame drive current signal CFDC to the current supply level circuits 22. The drive current load circuit 24 includes a first load transistor M5, a second load transistor M6, a first signal storage capacitor C1, a second signal storage capacitor C2, and a reset transistor M7. The first load transistor M5 and the second load transistor M6 are each N-channel MOSFETs, although other types of transistors may be utilized. The first load transistor M5 and the second load transistor M6 each function as binary switches wherein the drain to source path is closed, or low resistance, when the transistor M5, M6 is on, and the drain to source path is open, or high resistance, when the transistor M5, M6 is off. The gate of the first load transistor M5 receives a first load signal LOAD1 which is binary and has an enable value and a disable value, and the gate of the second load transistor M6 receives a second load signal LOAD2 which is binary and has an enable value and a disable value. The first signal storage capacitor C1 and the second signal storage capacitor C2 each retain a voltage level and include a first terminal and a second terminal. The reset transistor M7 is an N-channel MOSFET, although other types of transistors may be utilized. The reset transistor M7 functions as a variable resistance between the drain and the source, whose resistance value is set by the voltage level on the gate. The gate of the reset transistor M7 receives a reset signal R which is an analog signal and a global signal that is connected to each single LED driver circuit 20.

The drain of the first load transistor M5 receives a next frame drive current signal NFDC. The source of the first load transistor M5 is connected to a first terminal of the first signal storage capacitor C1, whose second terminal is connected to ground. The first terminal of the first storage capacitor C1 is also connected to the drain of the second load transistor M6. The source of the second load transistor M6 is connected to the first terminal of the second signal storage capacitor C2. The second terminal of the second signal storage capacitor C2 is connected to ground. The first terminal of the second signal storage capacitor C2 is also connected to the drain of the reset transistor M7 and provides the direct current signal DC to the current supply level circuits 22.

Figure 5:
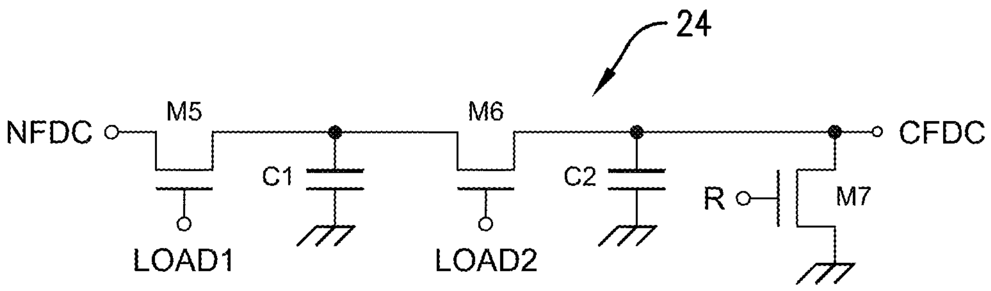
FIG. 5 is a schematic diagram of a drive current load circuit.

With reference to FIGS. 4 and 5, the single LED driver circuit 20 may operate as follows. The scene generator 12 outputs one or more signals to the single LED driver circuits 20 of the LED array driver circuitry 14 whose level or data value varies according to the scene to be projected. For a given frame of a scene, if the associated LED 18 is supposed to be off, then the circuit enable signals CE1, CE2, etc., for each current supply level circuit 22 are set to turn the circuit enable transistors M4-1, M4-2, etc., off so that no current, or very little current, flows through the current supply level circuits 22 and thus the LED 18.

For a given frame of a scene, if the associated LED 18 is supposed to be on, then the scene generator 12 determines the apparent temperature of the pixel/LED 18 and determines the amount of current that should flow through the LED 18 in order to emit radiation with the apparent temperature. Based on the amount of current, the scene generator 12 further determines how many current supply level circuits 22 should be enabled, and thus the values of the circuit enable signals CE1, CE2, etc. For example, if the LED current is determined to be less than 1 mA, then only the second current supply level circuit 22 may be utilized. So the circuit enable signal CE2 may receive an enable value, while the other circuit enable signals CE1, etc., receive a disable value. In some situations, more than one current supply level circuit 22 may be enabled to provide higher current resolution, and in turn, greater apparent temperature resolution—particularly at higher temperature ranges. Hence, the first current supply level circuit 22 may be enabled to provide up to 20 mA, for example, of current to the LED 18 so that it can emit radiation with an apparent temperature in the range of 1000 K to 2000 K, for example, in units of 50 K, for example. In order to provide finer resolution apparent temperature control, for example in units of 10 K (above 1000 K), one or more other current supply level circuits 22 may be enabled to provide up to 100 microamps (μA), for example.

Also, based on the amount of current, the scene generator 12 determines the levels of the gain control signals GC1, GC2, etc. Depending on which current supply level circuits 22 are enabled and how much current is required, the scene generator 12 determines the levels of the gain control signals GC1, GC2, etc., accordingly. For example, if only the first current supply level circuit 22 is enabled, then gain control signal GC1 receives a value according to the amount of current required, and the other gain control signals GC2, etc., may be set to zero, although it may not matter because the other current supply level circuits 22 are disabled.

Figure 6:
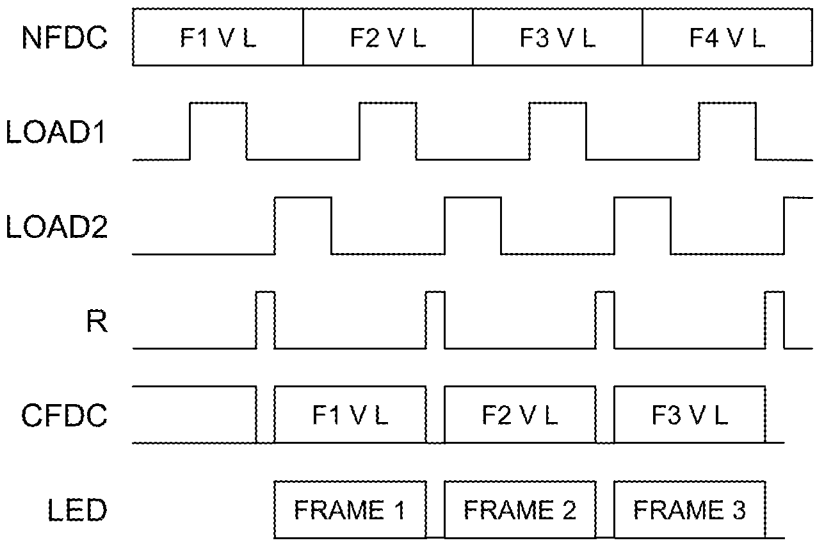
FIG. 6 is a timing diagram illustrating an operation of the drive current load circuit.

Referring to FIG. 6, the scene generator 12 further determines a level for the next frame drive current signal NFDC and by default, the current frame drive current signal CFDC. At the beginning of a scene, the scene generator 12 determines the current for the associated LED 18 for the first frame and outputs the appropriate voltage level to the next frame drive current signal NFDC, shown as frame 1 voltage level (F1 V L) in FIG. 6, which is applied to the drain of the first load transistor M5. The first load signal LOAD1 is set to an enable value for a first period which turns on the first load transistor M5, allowing the next frame drive current signal NFDC to charge the first signal storage capacitor C1 to the voltage level of the next frame drive current signal NFDC. The reset signal R is enabled for a brief pulse, which briefly turns on the reset transistor M7 and discharges the voltage on the second signal storage capacitor C2 and resets the level of the current frame drive current signal CFDC. The second load signal LOAD2 is set to an enable value for a second period which is typically equal to the first period and delayed from the first period so that the second period and the first period do not overlap. The second load signal LOAD2 being set to the enable value turns on the second load transistor M6, allowing the voltage level from the first signal storage capacitor C1 to charge the second signal storage capacitor C2 to the same voltage level—effectively transferring the voltage level from the first signal storage capacitor C1 to the second signal storage capacitor C2. At the same time, the current frame drive current signal CFDC is raised to the voltage level of the second signal storage capacitor C2, indicated as F1 V L in FIG. 6. (There may be a slight loss in the voltage level from NFDC node to the CFDC node in FIG. 6.) With the current frame drive current signal CFDC, the gain control signals GC1, GC2, etc., and the circuit enable signals CE1, CE2, etc., all set to their appropriate values, the LED 18 emits radiation at its frame 1 apparent temperature value.

The scene generator 12 continues to generate the voltage levels for the next frame drive current signal NFDC, along with the values for the gain control signals GC1, GC2, etc., and the circuit enable signals CE1, CE2, etc., for each frame at a constant frequency. The scene generator 12 also generates the values for the first load signal LOAD1, the second load signal LOAD2, and the reset signal R with the timing shown in FIG. 6 so that the current frame drive current signal CFDC is reset before being set to the appropriate voltage level for each frame F2 V L, F3 V L, and so forth. With the timing of the signals from the scene generator 12 and the operation of the drive current load circuit 24, the LED 18 maintains its apparent temperature value for each frame for most of the time period of each frame, with the exception of when the second signal storage capacitor C2 is briefly discharged. This functionality allows the scene displayed on the LED array 16 to transition smoothly from the current frame to the next frame, without having unintentional imagery being displayed resulting from residual voltage on the current frame drive current signal CFDC.

The reset transistor M7 in the drive current load circuit 24 serves another function. If the LED 18 is stuck on due to a defect in the single LED driver circuit 20 that causes all of the transistors M2, M3, M4 to be on in at least one of the current supply level circuits 22, then the reset transistor M7 may be able to turn off the LED 18 or at least dim the LED 18. In various embodiments, during normal operation of the IR scene projector system 10, the reset signal R may be set to a small, non-zero voltage level to turn the reset transistor M7 on so that a small amount of current flows from the drain to the source. For non-defective circuitry, the reset transistor M7 being on a small amount will have little effect. But, for defective circuitry resulting in a stuck-on LED 18, the reset transistor M7 continuously discharges the second signal storage capacitor C2, thereby reducing the voltage level of the current frame drive current signal CFDC, which turns off the current frame drive current transistor M3-1, M3-2, etc., and turns off, or at least dims, the LED 18.

Figure 7:
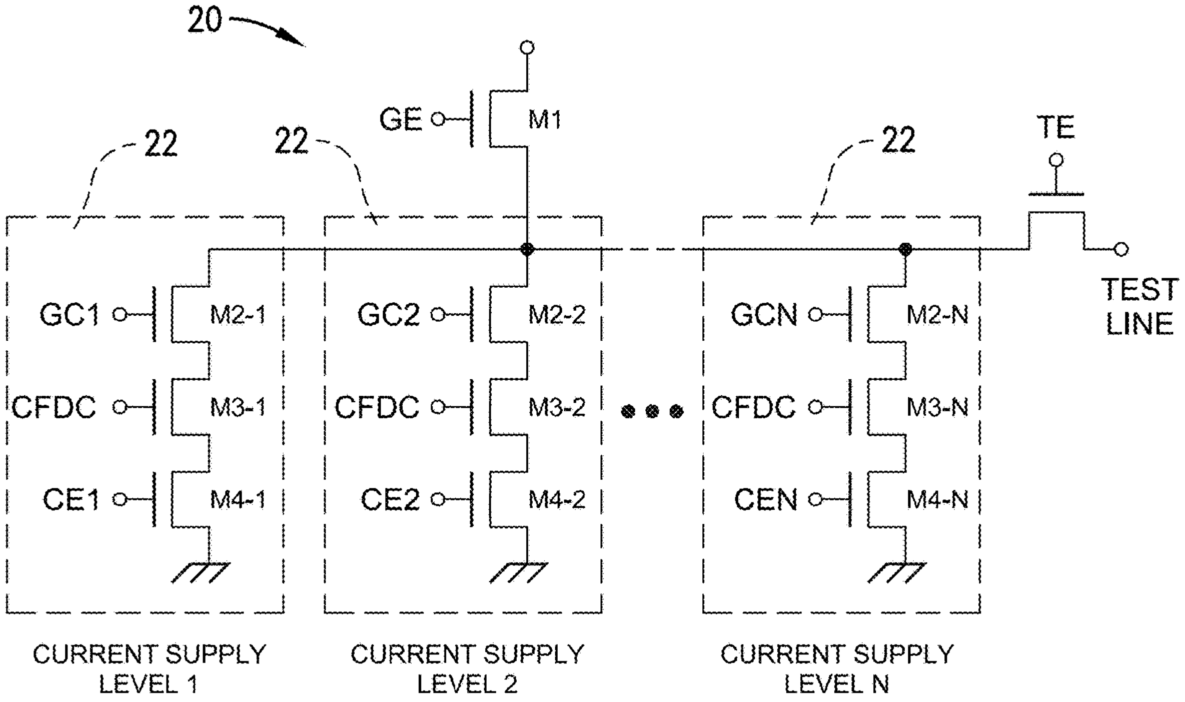
FIG. 7 is a schematic diagram of the first embodiment of the single LED driver circuit including components for testing.
Figure 8:
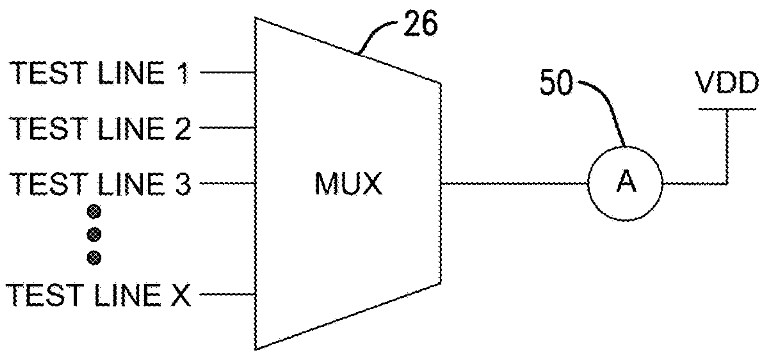
FIG. 8 is a block schematic diagram of the components utilized for testing the LED array driver circuitry.

Referring to FIGS. 7 and 8, in certain embodiments, the LED array driver circuitry 14 may include testing capabilities at the chip level or the wafer level. Before the LED array 16 is bonded to the LED array driver circuitry 14 chip, each single LED driver circuit 20 is implemented without the LED 18, as shown in FIG. 7. In addition, each single LED driver circuit 20 may include a test line transistor M8, which is an N-channel MOSFET (although other types of transistor could be utilized) and has a drain connected to the node between the global enable transistor M1 and the current supply level circuits 22. The test line transistor M8 has a gate that receives a global, binary test enable signal TE and a source connected to a test line signal TEST LINE. The test line signal TEST LINE 1-TEST LINE X from each single LED driver circuit 20 (assuming there are "X" number of single LED driver circuits 20 in the LED array driver circuitry 14) is connected to a successive one of a plurality of inputs of a multiplexer, or selector circuit, 26 which resides on the LED array driver circuitry 14 chip. The multiplexer 26 includes an output and control, or configuration, lines which configure the multiplexer 26 to establish an electrical connection between the output and each input in turn selectively. The output of the multiplexer 26 is connected to an ammeter 50, or other current measuring device, that is positioned off the LED array driver circuitry 14 chip. In addition, the ammeter 50 is connected to a voltage supply Vdd.

The LED array driver circuitry 14 is tested by applying an enable value to the test enable signal TE, which turns on the test enable transistor M8 for each single LED driver circuit 20 and allows access to the current supply level circuits 22. The control lines of the multiplexer 26 are set to provide electrical connection between the voltage supply Vdd and each selected test line signal TEST LINE 1-TEST LINE X in turn. While the test line signal TEST LINE for any given single LED driver circuit 20 is selected, the settings for the voltage levels for the next frame drive current signal NFDC, along with the values for the gain control signals GC1, GC2, etc., and the circuit enable signals CE1, CE2, etc., are varied to allow a range of currents to flow from the voltage supply Vdd so that the currents can be measured by the ammeter 50. The results of the current flow for each single LED driver circuit 20 may be tabulated and used to determine a quality rating for each LED array driver circuitry 14 chip. In some embodiments, the LED array driver circuitry 14 chips may be sorted into a plurality of bins according to the quality rating, wherein each LED array driver circuitry 14 chip with the same, or similar, quality rating is placed in the same bin.

Figure 9:
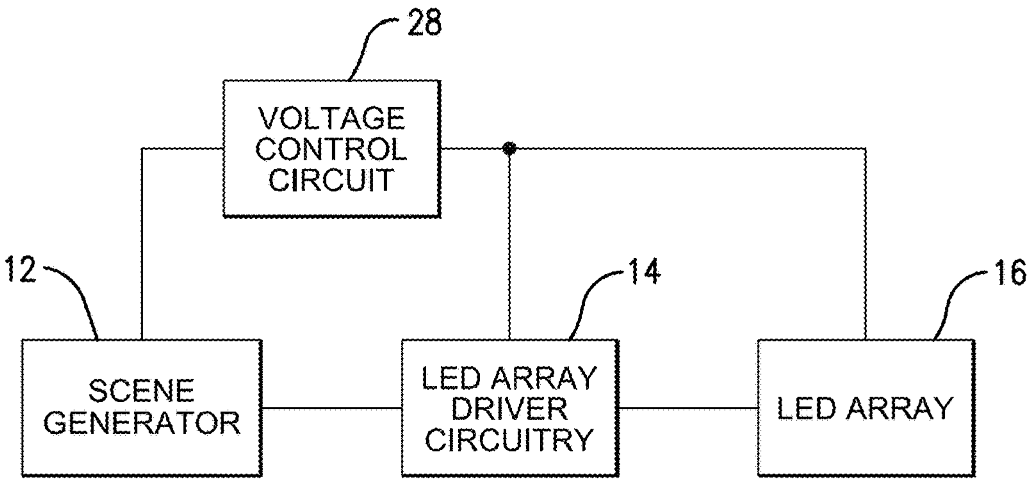
FIG. 9 is a block schematic diagram of the components of the infrared scene projector system including a voltage control circuit.

Referring to FIG. 9, in certain embodiments, the IR scene projector system 10 further comprises a voltage control circuit 28 configured to control the level of the voltage for the VLED and/or Vdd nodes for the LED array driver circuitry 14 and the LED array 16. The voltage control circuit 28 may include voltage supply circuits, voltage regulator circuits, voltage converter circuits, voltage inverter circuits, and or the like, or combinations thereof. In addition, the voltage control circuit 28 may include processing and/or control circuitry. The level of the voltage for the VLED and/or Vdd nodes for the LED array driver circuitry 14 and the LED array 16 may be reduced from its normal operating level according a number of pixels in the scene to be displayed that have a zero apparent temperature value. For example, if greater than a certain threshold number of pixels, such as 50%, have a zero apparent temperature value, then the level of the voltage for the VLED and/or Vdd nodes may be reduced from its normal operating level. The level of the voltage for the VLED and/or Vdd nodes may be reduced by a percentage value, such as 50%, or by a magnitude, such as 5 V. In other situations, the level of the voltage for the VLED and/or Vdd nodes may be reduced from its normal operating level according to an average value, or a median value, of the apparent temperature of the scene to be displayed. For example, if the average or median value of the apparent temperature is less than a threshold temperature, then the level of the voltage for the VLED and/or Vdd nodes may be reduced from its normal operating level. In still other situations, the level of the voltage for the VLED and/or Vdd nodes may be reduced from its normal operating level on a periodic basis. For example, the level of the voltage for the VLED and/or Vdd nodes may be reduced for a brief period of time before each frame of the scene is displayed.

The voltage control circuit 28 receives input, such as one or more electronic signals, from the scene generator 12. In some embodiments, the voltage control circuit 28 may receive a single electronic signal whose level or data value determines the level of the voltage for the VLED and/or Vdd nodes. The level or data value of the single electronic signal may be determined by the scene generator 12 according to the criteria discussed above. The voltage control circuit 28 outputs the voltage for the VLED and/or Vdd nodes for the LED array driver circuitry 14 and the LED array 16 whose level varies according to the single electronic signal from the scene generator 12. For example, the voltage for the VLED and/or Vdd nodes decreases as the level or data value of the single electronic signal from the scene generator 12 decreases and increases as the level or data value of the single electronic signal from the scene generator 12 increases. In other embodiments, the voltage control circuit 28 may receive one or more electronic signals or data streams whose level or data value varies according to the apparent temperature of each pixel for each frame of the scene to be displayed. Using these signals, the voltage control circuit 28 may determine the level for the VLED and/or Vdd nodes according to the criteria discussed above and may output the voltage for the VLED and/or Vdd nodes.

Figure 10:
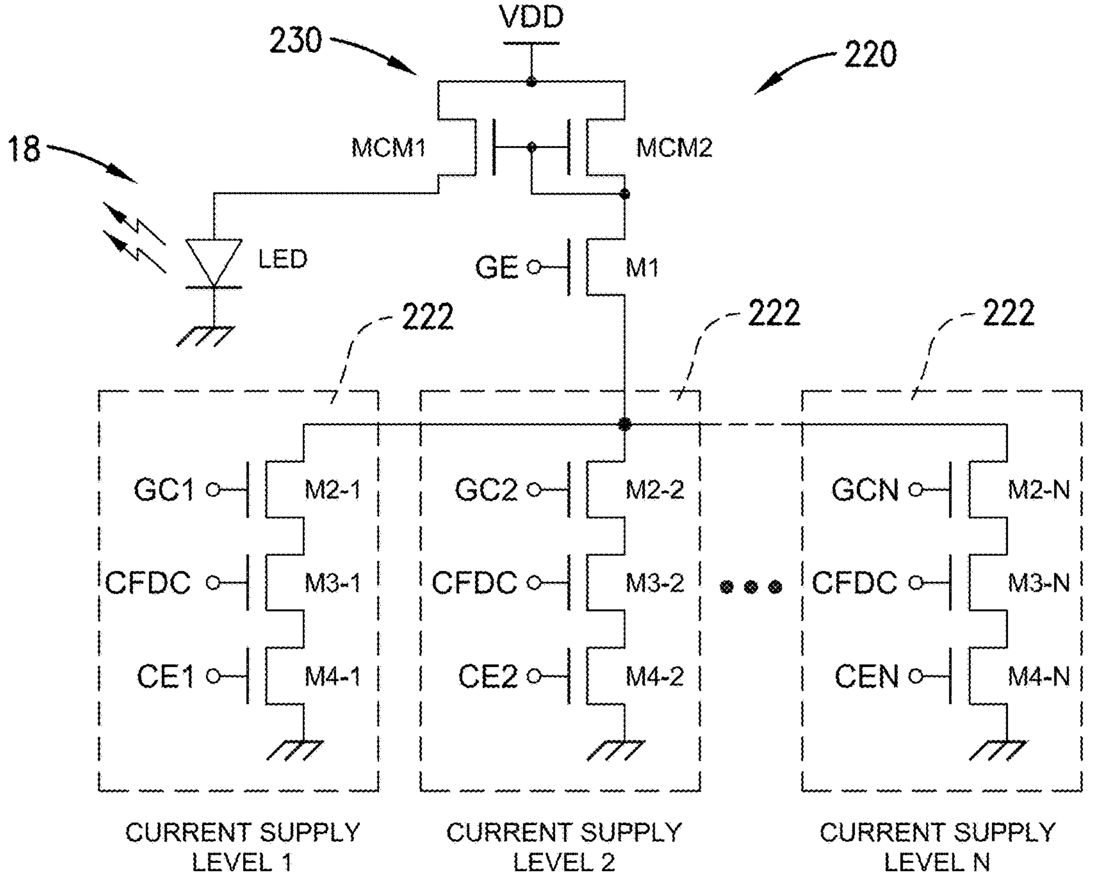
FIG. 10 is a schematic diagram of a second embodiment of a single LED driver circuit.

A first alternative embodiment of the single LED driver circuit 220 is shown in FIG. 10 and includes a global enable transistor M1 and a plurality of current supply level circuits 222, each of which are the same or similar to the like-named components discussed above for the single LED driver circuit 20. The connections of the global enable transistor M1 and the current supply level circuits 222 are the same or similar to the connections from the single LED driver circuit 20. The single LED driver circuit 220 adds a current mirror circuit 230 which includes mirror connected transistors MCM1, MCM2. In exemplary embodiments, the transistors MCM1, MCM2 are N-channel MOSFETs—although other types of transistors may be used. The drains of the transistors MCM1, MCM2 are connected to a voltage source Vdd, and the gates of the transistors MCM1, MCM2 are shorted together and connected to the source of transistor MCM2 as well as the drain of the global enable transistor M1. The source of transistor MCM1 is connected to the anode of the LED 18. The current mirror configuration provides for equal amounts of current to flow through the transistor MCM1 and the transistor MCM2. Therefore, the settings of the gain control, drive current, and circuit enable signals used to adjust the current flow through each current supply level circuit 222 also adjust the same amount of current flow through the LED 18.

Figure 11:
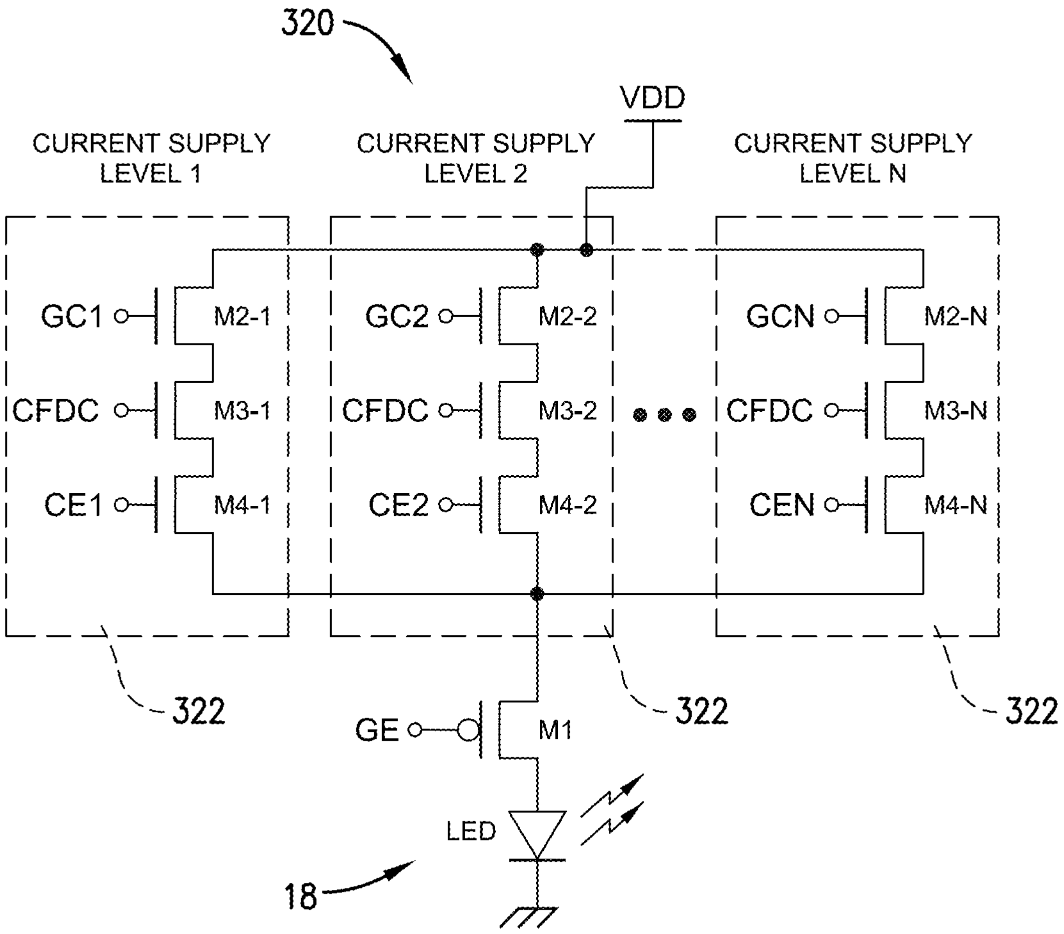
FIG. 11 is a schematic diagram of a third embodiment of a single LED driver circuit.

A second alternative embodiment of the single LED driver circuit 320 is shown in FIG. 11 and includes a global enable transistor M1 and a plurality of current supply level circuits 322. The global enable transistor M1 is a P-channel MOSFET. The current supply level circuit 322 is similar to the current supply level circuit 22 except that the gain control transistor M2, the drive current transistor M3, and the circuit enable transistor M4 are each P-channel MOSFETs. The drain of the gain control transistor M2 is connected to the voltage source Vdd. The source of the circuit enable transistor M4 is connected to the drain of the global enable transistor M1. The source of the global enable transistor M1 is connected to the anode of the LED 18, whose cathode is connected to ground.

Figure 12B:
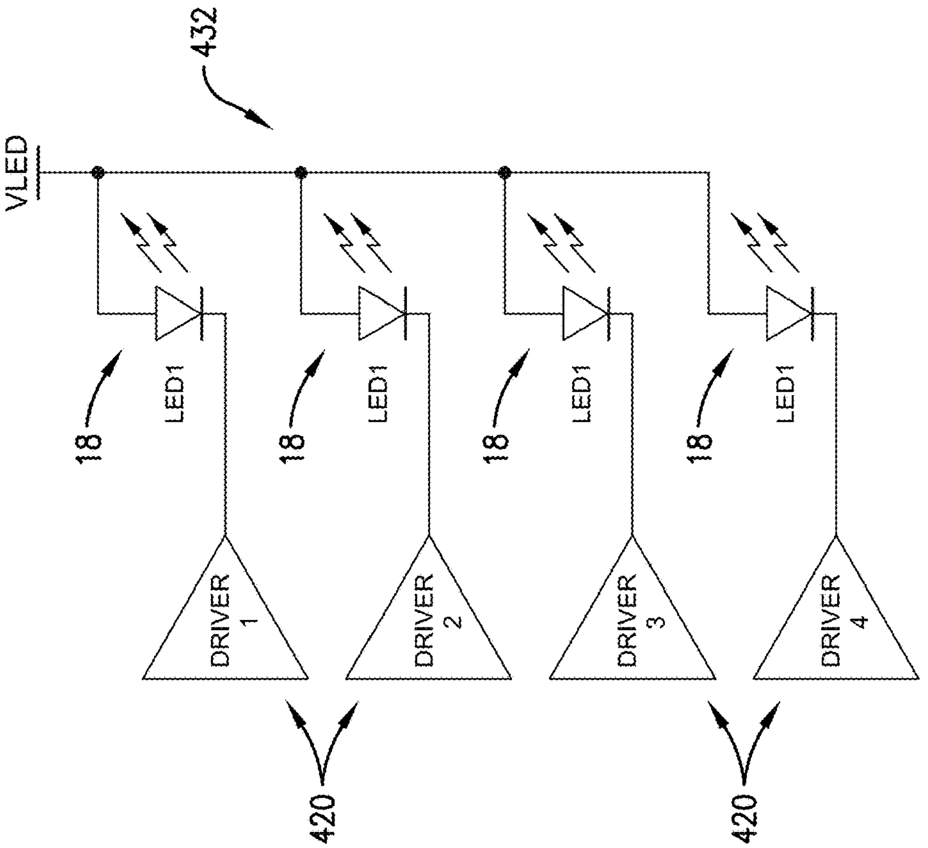
FIG. 12B is a schematic diagram of a second embodiment of the pixel group.
Figure 12A:
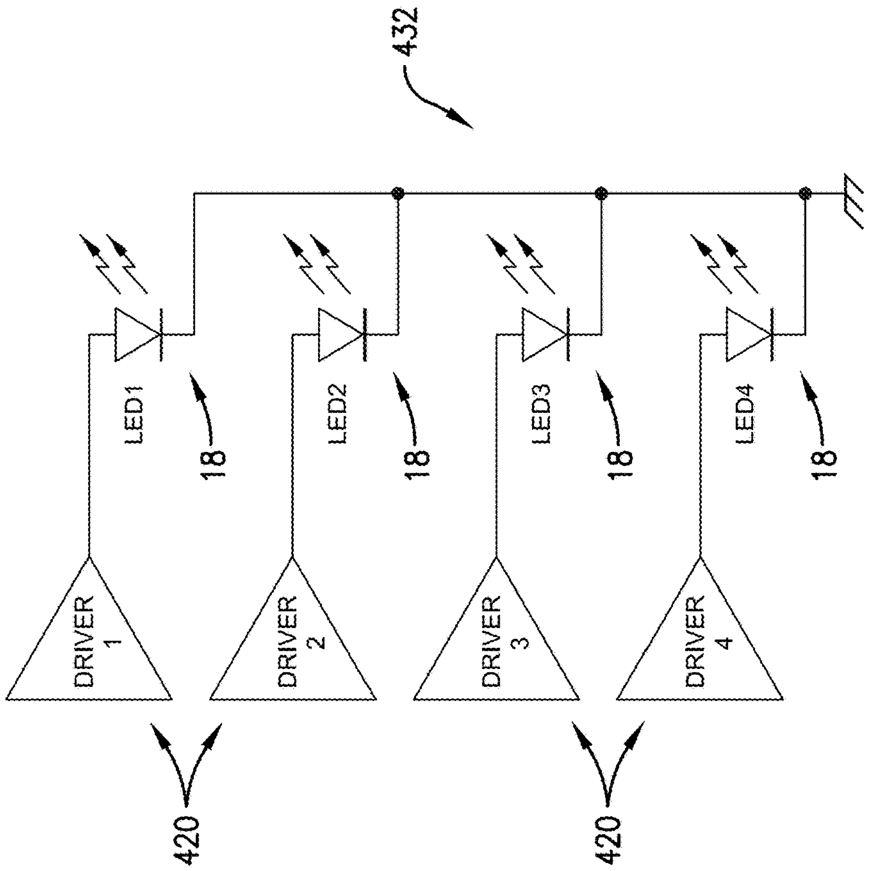
FIG. 12A is a schematic diagram of a first embodiment of a pixel group.
Figure 13A:
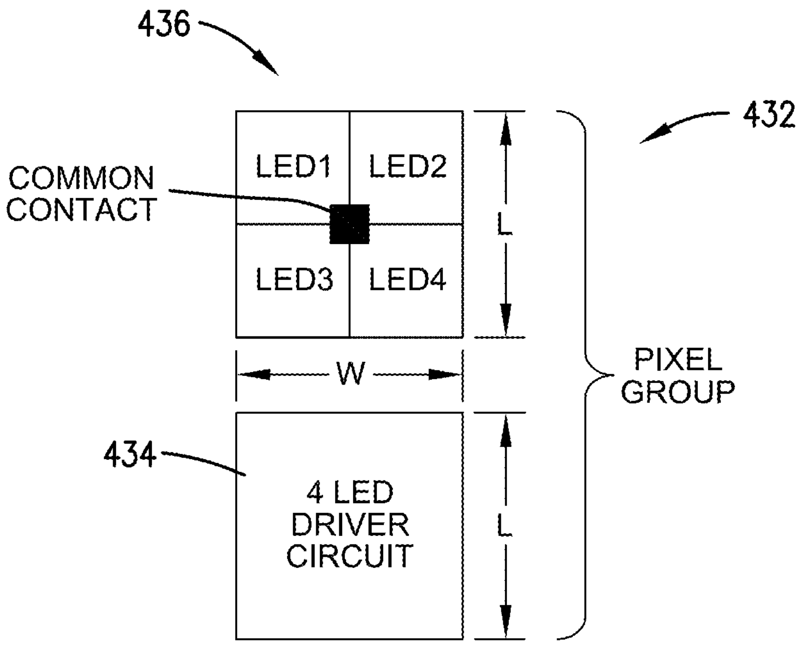
FIG. 13A is a block schematic diagram of a physical design of the pixel group including a multiple LED driver circuit and an LED group.

Referring to FIGS. 12A, 12B, 13A, 13B, 13C, and 13D, a plurality of single LED driver circuits 420 and a plurality of LEDs 18 associated with the single LED driver circuits 420 may be combined to form a pixel group 432 in order to create efficiencies at the physical design level, such as transistor and component layout for an integrated circuit (chip) implementation. Each single LED driver circuit 420 may be formed from the single LED driver circuit 20, the single LED driver circuit 220, or the single LED driver circuit 320. The combination of the single LED driver circuits 420 forms a multiple LED driver circuit 434, and the combination of the LEDs 18 forms an LED group 436. When performing the transistor and component layout of the combined single LED driver circuits 420 to form the multiple LED driver circuit 434, being able to share physical design features, such as ion implantation areas, between the single LED driver circuits 420 as well as avoid some minimum spacing issues allows the multiple LED driver circuit 434 to take up less space on the chip than if the transistor and component layout of the single LED driver circuits 420 were performed individually. At the physical design level, each LED 18 includes a p contact for the p node of the LED 18 and an n contact for the n node of the LED 18. It is more efficient at the physical design level for a plurality of LEDs 18 to share one of the contacts. Thus, each LED group 436 includes a common contact, as shown in FIG. 13A. There is also an optimum range of numbers of single LED driver circuits 420 and LEDs 18 to combine to form the pixel group 432. Too few single LED driver circuits 420 and LEDs 18 would fail to take advantage of the efficiencies that combining the components creates. Too many single LED driver circuits 420 and LEDs 18 would create difficulties with physical design, such as routing too many nodes to the same contact or the like. An exemplary embodiment of the multiple LED driver circuit 434 includes four single LED driver circuits 420, and an exemplary embodiment of the LED group 436 includes four LEDs 18.

For each pixel group 432, in some embodiments, the LEDs 18 may be connected to the single LED driver circuits 420 in a common cathode configuration, as shown in FIG. 12A, wherein each single LED driver circuit 420 is connected to the anode of its associated LED 18 and the cathodes of the LEDs 18 are connected together and tied to electrical ground. In other embodiments, the LEDs 18 may be connected to the single LED driver circuits 420 in a common anode configuration, as shown in FIG. 12B, wherein each single LED driver circuit 420 is connected to the cathode of its associated LED 18 and the anodes of the LEDs 18 are connected together and tied to the voltage supply VLED.

The multiple LED driver circuit 434 is formed by placing the transistors and components, such as capacitors, for four single LED driver circuits 420 in a quadrilateral area that has a length L and a width W, as shown in FIG. 13A. The LED group 436 is formed by placing four LEDs 18 in a quadrilateral area that has the same length L and width W. The LEDs 18 are configured and placed such that each LED 18 is positioned in a successive quadrant of the area, and the common contact is positioned in adjacent corners of the quadrants and roughly in the center of the area. The common contact is configured to connect to a node, or pad, on the multiple LED driver circuit 434 which is connected to the voltage supply VLED or to electrical ground. If the pixel group 432 has a common anode configuration, then the common contact connects to the voltage supply VLED. If the pixel group 432 has a common cathode configuration, then the common contact connects to electrical ground.

Figure 13B:
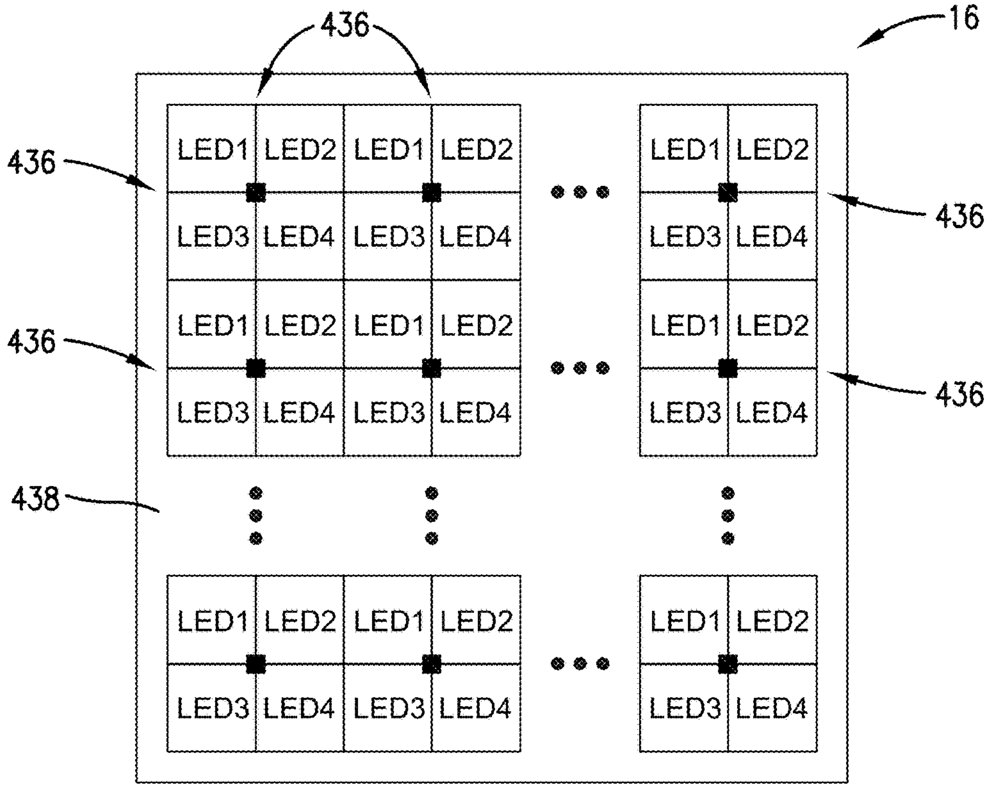
FIG. 13B is a block schematic diagram of an array of LED groups on an LED array chip.

Referring to FIG. 13B, an LED array chip 438 is formed, at least in part, by placement and routing of the LED group 436, wherein a first plurality of LED groups 436 are placed adjacent to one another in the X direction with a first center-to-center spacing, or pitch, to form a row of LED groups 436. The first center-to-center spacing may be the same as the width W of the LED group 436. The placement and routing of the LED group 436 continues with a plurality or rows of LED groups 436 being placed adjacent to one another in the Y direction with a second center-to-center spacing, or pitch, to form the two dimensional array. The second center-to-center spacing may be the same as the length L of the LED group 436.

Figure 13C:
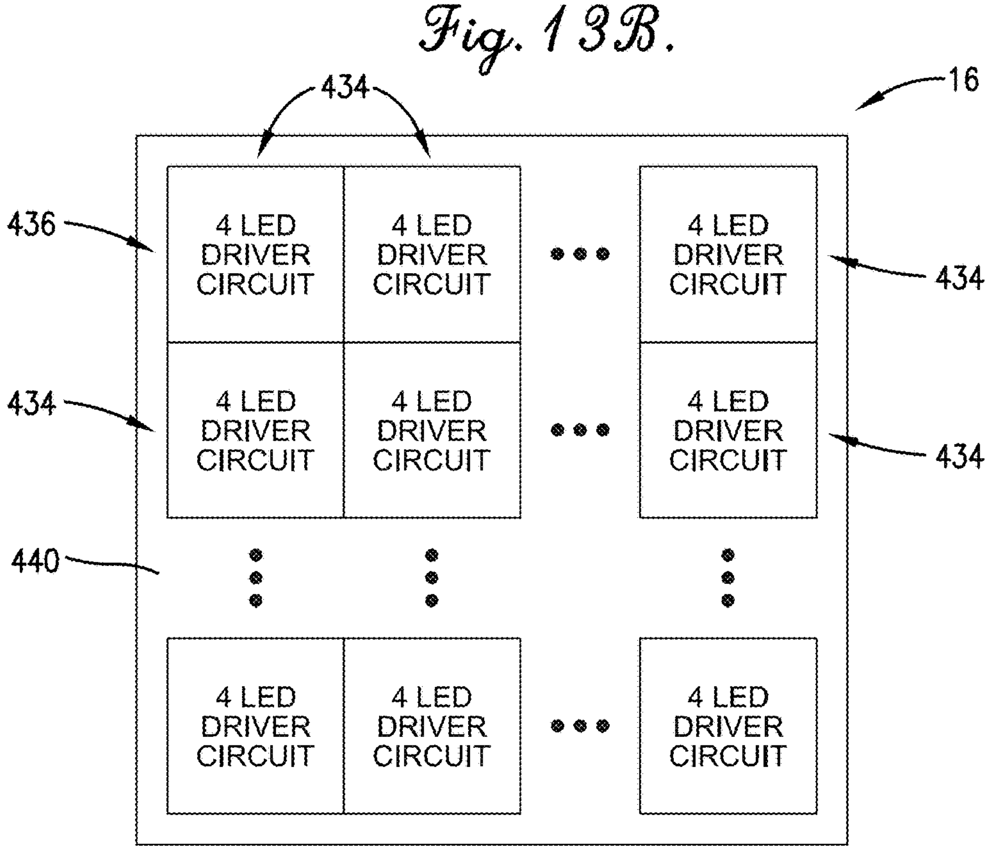
FIG. 13C is a block schematic diagram of an array of multiple LED driver circuits on an LED array driver circuitry chip.

Referring to FIG. 13C, an LED array driver circuitry chip 440 is formed, at least in part, by placement and routing of the multiple LED driver circuit 434, wherein a first plurality of multiple LED driver circuits 20 are placed adjacent to one another in the X direction with a first center-to-center spacing, or pitch, to form a row of multiple LED driver circuits 20. The first center-to-center spacing may be the same as the width W of the multiple LED driver circuit 434. The placement and routing of the multiple LED driver circuit 434 continues with a plurality or rows of multiple LED driver circuits 20 being placed adjacent to one another in the Y direction with a second center-to-center spacing, or pitch, to form the two dimensional array. The second center-to-center spacing may be the same as the length L of the multiple LED driver circuit 434.

Figure 13D:
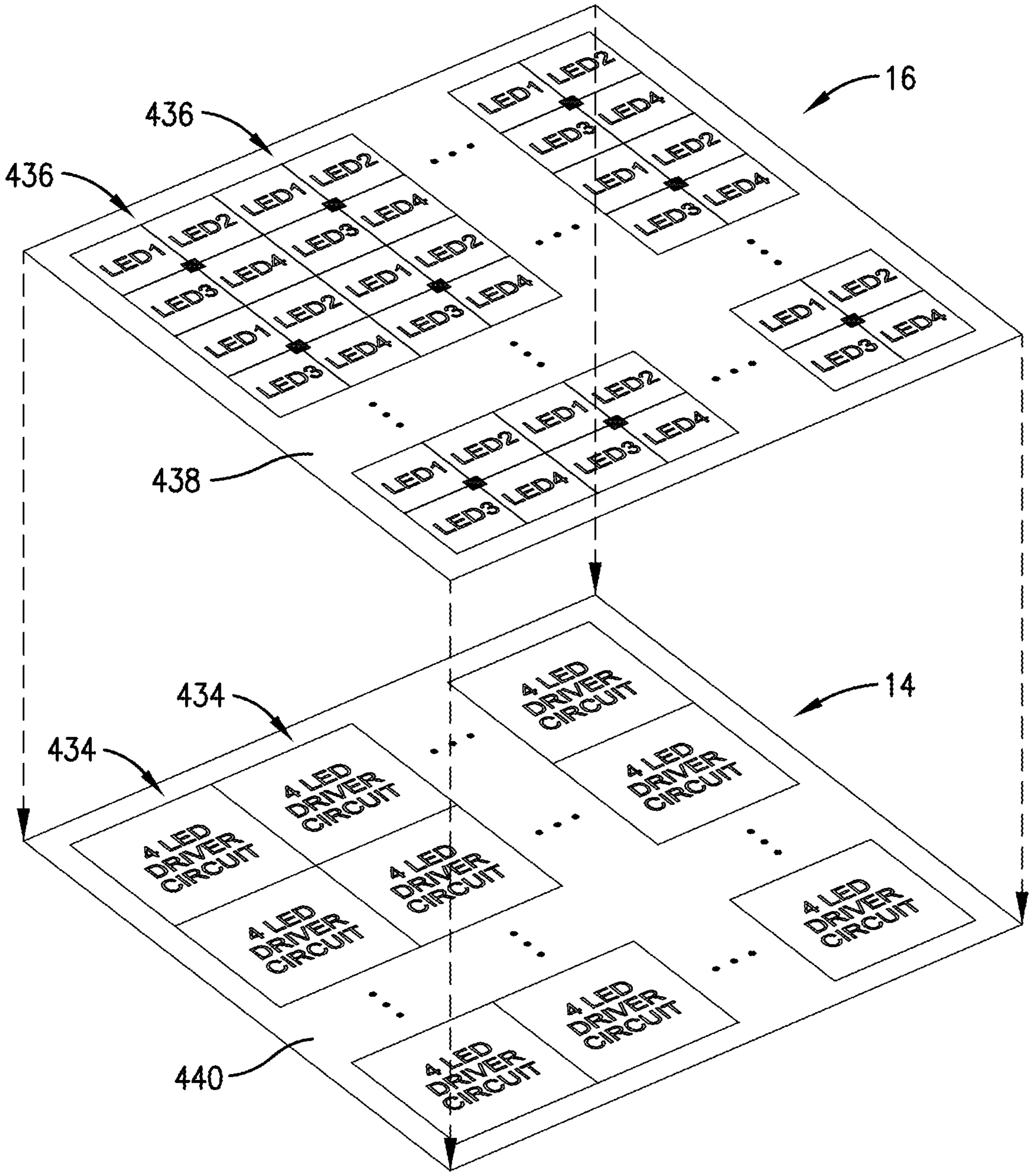
FIG. 13D is a block schematic diagram of an alignment and attachment of the LED array chip to the LED array driver circuitry chip.

Referring to FIG. 13D, the LED array chip 438 is flip chip solder bonded to the LED array driver circuitry chip 440 such that each LED group 436 is placed on top of, connected to, and aligned with its associated multiple LED driver circuit 434.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A circuit for driving a light emitting diode (LED), the circuit comprising:

- a plurality of current supply level circuits, each current supply level circuit configured to control a different amount of electric current flowing through the LED, each current supply level circuit including:
  - a circuit enable transistor configured to enable current flow through the current supply level circuit,
  - a drive current transistor configured to control an amount of electric current flowing through the current supply level circuit, and
  - a gain control transistor configured to control a range of the amount of electric current flowing through the current supply level circuit.

2. The circuit for driving an LED of claim 1, further comprising a global enable transistor configured to turn the LED progressively on and/or off during any selective time period.

3. The circuit for driving an LED of claim 2, wherein the global enable transistor is electrically connected in series with the LED.

4. The circuit for driving an LED of claim 1, wherein each current supply level circuit includes a drive current load circuit configured to control a time for when the drive current transistor receives a first voltage level which sets the amount of electric current flowing through the current supply level circuit.

5. The circuit for driving an LED of claim 4, wherein the drive current load circuit includes:

a first signal storage capacitor and a second signal storage capacitor, each signal storage capacitor configured to store a voltage level, a first load transistor configured to control a transfer of the first voltage level from an external source to the first signal storage capacitor, and a second load transistor configured to control the transfer of the first voltage level from the first signal storage capacitor to the second signal storage capacitor.

6. The circuit for driving an LED of claim 4, wherein the drive current load circuit further includes a reset transistor configured to discharge the first voltage level from the second signal storage capacitor.

7. The circuit for driving an LED of claim 1, further comprising a test enable transistor configured to control the flow of electric current from an external source through the current supply level circuits during a test of the circuit for driving an LED.

8. The circuit for driving an LED of claim 1, wherein each current supply level circuit is electrically connected in series with the LED and in parallel with the other current supply level circuits.

9. The circuit for driving an LED of claim 1, wherein the circuit enable transistor, the drive current transistor, and the gain control transistor are electrically connected in series with one another.

10. The circuit for driving an LED of claim 1, wherein the circuit enable transistor, the drive current transistor, and the gain control transistor are each N-channel metal oxide semiconductor field effect transistors.

11. The circuit for driving an LED of claim 1, wherein the circuit enable transistor, the drive current transistor, and the gain control transistor are each P-channel metal oxide semiconductor field effect transistors.

12. The circuit for driving an LED of claim 1, wherein a maximum amount of electric current that flows through the current supply level circuit varies according to a size of the drive current transistor.

13. The circuit for driving an LED of claim 1, wherein the LED is an infrared LED configured to emit radiation having an apparent temperature and a total amount of electric current flowing through the current supply level circuits varies non-linearly according to the apparent temperature.

14. The circuit for driving an LED of claim 1, further comprising a current mirror circuit including a first transistor and a second transistor connected in a current mirror configuration such that electric current flowing through the LED also flows through the first transistor and electric current flowing through the current supply level circuits also flows through the second transistor.

15. A circuit for driving a light emitting diode (LED) to display a portion of a frame for a sequence of frames, the circuit comprising:

a plurality of current supply level circuits, each current supply level circuit configured to control a different amount of electric current flowing through the LED, each current supply level circuit including:

a circuit enable transistor configured to enable current flow through the current supply level circuit, a drive current transistor configured to control an amount of electric current flowing through the current supply level circuit, a gain control transistor configured to control a range of the amount of electric current flowing through the current supply level circuit, and a drive current load circuit configured to receive a first voltage level which sets the amount of electric current flowing through the current supply level circuit for a next frame and output a second voltage level to the drive current transistor to set the amount of electric current flowing through the current supply level circuit for a current frame.

16. The circuit for driving an LED of claim 15, wherein the drive current load circuit includes:

a first signal storage capacitor configured to store the first voltage level, a second signal storage capacitor configured to store the second voltage level, a first load transistor configured to control a transfer of the first voltage level from an external source to the first signal storage capacitor, and a second load transistor configured to control the transfer of the first voltage level from the first signal storage capacitor to the second signal storage capacitor so that the first voltage level is stored as the second voltage level.

17. The circuit for driving an LED of claim 16, wherein the drive current load circuit further includes a reset transistor configured to discharge the second voltage level from the second signal storage capacitor.

18. A circuit for driving an infrared (IR) light emitting diode (LED) configured to emit radiation having an apparent temperature, the circuit comprising:

a plurality of current supply level circuits, each current supply level circuit configured to control a different amount of electric current flowing through the IR LED such that each current supply level circuit controls the electric current flowing through the IR LED for a different range of apparent temperatures, each current supply level circuit including:

a circuit enable transistor configured to enable current flow through the current supply level circuit, a drive current transistor configured to control an amount of electric current flowing through the current supply level circuit, and a gain control transistor configured to control a range of the amount of electric current flowing through the current supply level circuit.

19. The circuit for driving an IR LED of claim 18, wherein each current supply level circuit is electrically connected in series with the IR LED and in parallel with the other current supply level circuits.

20. The circuit for driving an IR LED of claim 18, wherein the circuit enable transistor, the drive current transistor, and the gain control transistor are electrically connected in series with one another.

* * * * *